United States Patent [19]

Bennett et al.

[11] Patent Number: 4,559,058
[45] Date of Patent: Dec. 17, 1985

[54] METHOD FOR IMPROVING THE FASTNESS OF DYEINGS AND OPTICAL BRIGHTENINGS WITH AMINE, CYANAMIDE DERIVATIVE AND EPIHALOHYDRIN CONDENSATE

[75] Inventors: Brian Bennett, Bradford; Donald K. Clough, Bingley, both of United Kingdom

[73] Assignee: Sandoz Ltd., Basel, Switzerland

[21] Appl. No.: 625,813

[22] Filed: Jun. 28, 1984

[30] Foreign Application Priority Data

Jun. 30, 1983 [GB] United Kingdom ............... 8317846
Sep. 19, 1983 [GB] United Kingdom ............... 8324989

[51] Int. Cl.$^4$ .......................... C08J 3/06; D05P 5/08
[52] U.S. Cl. ........................................ 8/496; 8/543;
  8/556; 8/680; 8/685; 8/917; 8/918; 8/648;
  252/8.8; 252/301.21; 524/72; 528/340;
  528/342; 528/366; 528/405
[58] Field of Search ................... 8/496, 556; 528/340, 528/342

[56] References Cited

U.S. PATENT DOCUMENTS

| | | | |
|---|---|---|---|
| 2,649,354 | 8/1953 | Hemmi et al. | 8/551 |
| 3,403,113 | 9/1968 | Diethelm | 528/340 |
| 4,240,935 | 12/1980 | Dumas | 524/72 |
| 4,439,203 | 3/1984 | Runyon et al. | 8/496 |

Primary Examiner—A. Lionel Clingman
Attorney, Agent, or Firm—Gerald D. Sharkin; Richard E. Vila; Thomas C. Doyle

[57] ABSTRACT

A precondensate obtained by reacting
(A) the product of reacting a mono- or polyfunctional primary or secondary amine with cyanamide, dicyandiamide, guanidine or biguanidine and
(B) an epihalohydrin is obtained in the form of a stable aqueous dispersion by acidifying the reaction product, optionally in the presence of a water-soluble polymer. The product is useful as an after-treatment agent to improve the fastness of dyeings on cotton, wool or silk.

45 Claims, No Drawings

METHOD FOR IMPROVING THE FASTNESS OF DYEINGS AND OPTICAL BRIGHTENINGS WITH AMINE, CYANAMIDE DERIVATIVE AND EPIHALOHYDRIN CONDENSATE

This invention relates to an aftertreatment process for improving the fastness properties of dyes and optical brighteners on substrates containing hydroxy, amino and thiol groups.

It is known from British Patent Application No. 2 099 007 and equivalent U.S. Pat. No. 4,439,203, the disclosure of which is incorporated herein by reference, that the fastness properties of dyes and optical brighteners, particularly direct and reactive dyes, on hydroxy group-containing substrates may be improved by after-treatment with a precondensate of (A) the product of reacting a mono- or polyfunctional primary or secondary amine with cyanamide, dicyandiamide (DCDA), guanidine or biguanidine, whereby up to 50 mol % of the cyanamide, DCDA, guanidine or biguanidine may be replaced with a dicarboxylic acid or a mono- or di-ester thereof, said product (A) containing (B) an epihalohydrin or a precursor thereof, and subsequently carrying out a cross-linking step.

It has now been found that the stability of the precondensate is improved when, instead of being neutralised by alkali as disclosed in the above British Patent Application, it is acidified, optionally in the presence of a water-soluble polymer, whereby a stable dispersion of a salt form is obtained.

It has also been found that after-treatment with the precondensate, whether neutralised or acidified, improves the fastness properties of dyeings on substrates containing amino or thiol groups, particularly wool and silk.

Accordingly, the present invention provides a process for improving the fastness properties of a dyestuff or optical brightener on a substrate comprising fibres containing hydroxy-, amino-, or thiol-groups, by applying to the dyed, printed or brightened substrate a precondensate obtained by reacting (A) the product of reacting a mono- or polyfunctional primary or secondary amine with cyanamide, dicyandiamide (DCDA), guanidine or biguanidine; whereby up to 50 mole % of the cyanamide, DCDA, guanidine or biguanidine may be replaced with a dicarboxylic acid or a mono- or di-ester thereof, said product (A) containing reactive hydrogen atoms bound to nitrogen, and (B) an epihalohydrin or a precursor thereof and acidifying the reaction product and subsequently or simultaneously carrying out a cross-linking step.

By 'precondensate' is meant a reaction product which remains water-soluble and non-gelled, and is capable of further crosslinking.

Component (A) is preferably the reaction product of a polyalkylenepolyamine with cyanamide, dicyandiamide (DCDA) or guanidine, more preferably with DCDA. The polyamine is preferably of formula I

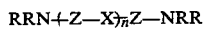

in which each

R independently is hydrogen or a $C_{1-10}$alkyl group unsubstituted or monosubstituted with hydroxy, $C_{1-4}$alkoxy or cyano, n is a number from 0 to 100

Z, or each Z independently when $n>0$, is $C_{2-4}$alkylene or hydroxyalkylene and X, or each X independently when $n>1$, is —O—, —S— or —NR— where R is as defined above, provided that the amine of formula I contains at least one reactive —NH— or —NH$_2$ group.

More preferably each R is hydrogen, n is 0 to 4, X is NH or —NCH$_3$— and Z, or each Z independently when $n>0$, is $C_{2-4}$alkylene. Particularly preferred compounds are diethylene triamine, triethylene tetramine, tetraethylene pentamine, 2-aminoethyl-3-aminopropylamine, dipropylene triamine and N,N-bis-(3-aminopropyl)methylamine.

Components A are known, and may be prepared by the methods described for example in British Pat. No. 657 753, U.S. Pat. No. 2,649,354 and British published application No. 2 070 006A. Suitably the amine, in free base or salt form, is reacted with the other starting material in the absence of water at elevated temperatures optionally in the presence of a non-aqueous solvent. Preferably the reaction is carried out in the absence of solvent at a temperature of 140°–160° C., and for most combinations of reagents, ammonia is evolved. The reagents are preferably reacted in a molar ratio of 0.1 to 1 mole of cyanamide, DCDA, guanidine or biguanidine per mole of reactive —NH or —NH$_2$ groups, and when DCDA is reacted with a polyalkylene polyamine, the molar ratio of the reactants is more preferably from 2:1 to 1:2, particularly about 1:1. The reaction product may be left in free base form or may be wholly or partially converted to the salt form by addition of acid; preferably sulphuric acid.

The products (A) are near-colourless viscous liquids or solids which are basic in character, water-soluble either in the free base or salt form, and contain reactive hydrogen atoms bonded to nitrogen.

Up to 50% mole, preferably up to 20% mole of the DCDA or other reagent to be reacted with the amine may be replaced by a dicarboxylic acid or a mono- or di-ester thereof. Suitable acids include adipic acid, oxalic acid and terephthalic acid, for example in the form of their dimethyl esters.

The reaction of component (A) with an epihalohydrin or a precursor thereof (B) is preferably carried out in an aqueous solution or dispersion at a temperature from room temperature to 100° C., preferably below 40° C. Preferred reagents are epichlorohydrin and dichlorohydrin, ClCH$_2$.CHOH.CH$_2$Cl, more preferably epichlorohydrin. The molar ratio of component (A) to epihalohydrin is preferably 1:0.1–0.5, more preferably 1:0.1–0.4, particularly 1:0.1–0.29, based on the number of moles of DCDA or analogous compound in (A). These molar ratios of DCDA to epihalohydrin are higher (that is, less epihalohydrin is used) than any exemplified in British Patent Application No. 2 099 007 when component (A) is the preferred 1:1 molar reaction product of DCDA and amine. Preferably the initial pH of the reaction mixture is adjusted to between 6 and 9 by addition of acid, preferably sulphuric acid.

In order to obtain the precondensate in the form of a stable dispersion, the reaction product is acidified, optionally in the presence of a water-soluble polymer for example polyvinyl alcohol, polyacrylamide or hydroxyethyl cellulose. The water-soluble polymer may be added to the reaction product before acidification, or may be present during the reaction between (A) and (B). The second alternative is preferred, but a water-soluble polymer must then be used which is not preferentially attacked by th epihalohydrin under the reaction conditions employed. When used, the polymer is preferably added in an amount of 0.1 to 0.5% by weight of the total mixture.

Acidification is carried out by adding an inorganic or organic acid, preferably sulphuric or formic acid, to give a final pH of 2-5, preferably 4-4.5. The acidified product is then in salt form and in the form of a dispersion rather than a solution, and has good chemical stability and long shelf-life. The presence of the water-soluble polymer may be desirable to ensure physical stability of the dispersion against settling out.

If acidification is carried out using sulphuric acid, the low solubility of the sulphate salt may give rise to a stable dispersion without the need to add a water-soluble polymer.

The improved chemical stability of the product according to the present invention may be demonstrated by carrying out test aftertreatments of dyeings on cotton, using the product of the invention and the corresponding product made according to the description in British Patent Application No. 2 099 007, in both cases using samples of product before and after storage at 40° C. for 2 weeks. It is found that the efficacy of the product of the invention is unaffected by this treatment. The product of British Patent Application No. 2 099 007, on the other hand becomes gelled and insoluble if in concentrated solution, while diluted solutions suffer a considerable loss in efficacy.

The substrate is preferably cellulose, regenerated cellulose or natural polyamide, particularly cotton, rayon, wool or silk alone or mixed with synthetic fibres. The substrate may be dyed, printed or brightened by any conventional methods, for example dyeing or brightening may be carried out by exhaust methods or by padding followed by thermofixation or cold dwell fixation or, in the case of reactive dyes, by alkaline fixation. The process according to the invention, when used upon cellulose substrates, is particularly suitable for reactive and direct dyestuffs, of which metal complex direct dyestuffs, especially copper complex dyes, are preferred. On natural polyamides, acid and metal complex dyes, particularly chromium and cobalt complex dyes, are preferred.

The process according to the invention is carried out upon a substrate on which the dyeing or printing process including any necessary fixation step, has been completed. The substrate may be dry, or may still be damp, provided that it is not so wet that it is incapable of further pick-up. The aftertreatment agent is applied to the substrate in aqueous solution in a long or short liquor exhaust process or by dipping, spraying, foam application, padding or other conventional application techniques. The preferred application method is by exhaust application at from room temperature to 50° C.

In an exhaust process, when a long liquor to goods ratio (>10:1) is used the concentration of precondensate in the liquor is preferably 0.25-3 g/l, more preferably 0.5-1.5 g/l, while for short liquor processes quantities of up to 30 g/l may be necessary. (All weights are based on the dry weight of active components.) Based on the dry weight of substrate, the quantity of precondensate used is preferably from 1-3% wt. more preferably approx. 2.5% wt.

The cross-linking step may take place in the exhaust bath under alkaline conditions, or may take place in a subsequent heat-curing step after exhaust application under neutral or acid conditions or after application by padding. The substrate may for example be dried at 70°-120° C. and finally crosslinked at a temperature of 130°-180° C. for 30 seconds to 8 minutes.

For dyeing on cotton, particularly suitable direct dyestuffs for use with the process of the invention are the following:

C.I. Direct Red 80, 83, 84, 92, 95, 207, 211, 218;
C.I. Direct Yellow 39, 50, 98, 106, 129;
C.I. Direct Violet 47, 66, 95;
C.I. Direct Blue 71, 77, 79, 80, 85, 90, 94, 98, 217, 251;
C.I. Direct Green 27, 31, 65, 67;
C.I. Direct Brown 103, 111, 113, 116, 220;
C.I. Direct Black 62, 117, 118;

and particularly suitable reactive dyes are

C.I. Reactive Violet 23,
C.I. Reactive Blue 23 and

C.I. Reactive Blue 79.

Dyeings and printings with direct dyestuffs often show inadequate wash fastness. The dyestuff which is bound to the surface of the cellulose fibres is largely removed from the fibres be repeated washings, and bleeding of the dyestuff into the wash liquid can cause partial readsorption onto undyed cellulose material.

There have been many attempts to overcome these disadvantages, for example by complexing on the fibre with metal salts, formation of the dyestuff on the fibre, treatment of the dyestuff and/or the fibre with formaldehyde, impregnation with artificial resins and aftertreatment with cationic auxiliaries. The use of cationic after-treatment auxiliaries has proved particularly effective.

The disadvantage of all previously used methods is that although improved fastness is indeed attained, the results are only temporary. Even in the case of cationic after-treatment, the auxiliary is removed from the fibres by repeated washings, particularly under alkaline conditions and at high temperatures such as 50°-100° C. The loss of the cationic auxiliary means that the dyeing loses its improved wet fastness again.

It was hoped to solve the wet fastness problem by the use of reactive dyes, which form a chemical bond to the fibre. However, a disadvantage of the use of reactive dyes is that although the dyestuff which is chemically bound to the fibre has excellent wash fastness, the goods must be washed thoroughly after dyeing in order to remove residual unfixed dyestuffs, which has poor wash fastness.

Treatment of dyed cellulose substrates according to the invention gives improved wet fastness properties, particularly fastness to washing, including washing under alkaline conditions at temperatures of 40°-90° C., particularly at 60° C. and above. For example repeated 30 minute 60° C. washings with a wash liquor containing 5 g/l soap and 2 g/l soda at a goods to liquor ratio of 1:50 are readily withstood.

In the case of dyeings with reactive dyes, the wash fastness of the unfixed dye may be raised to approximately the same level as that of the fixed dye, thereby eliminating the need to remove the unfixed dye.

For dyeings on wool, acid or metallised dyes may be used in conventional manner, followed by aftertreatment under mild alkaline conditions. Particularly suitable dyes include for example:

C.I. Acid Yellow 127
C.I. Acid Orange 67
C.I. Acid Red 412, 336, 339, 399

C.I. Acid Blue 126, 296.

The wool substrate may be chlorinated or unchlorinated. Treatment of a dyed wool substrate according to the invention may impart some degree of shrink-proofing as well as improving the wet fastness of the dyeing.

Although for the treatment of wool and silk both alkaline and acidic precondensate may be used, it is preferred to use a stable dispersion of precondensate formed by acidification as described above.

The following Examples, in which all parts and percentages are by weight and all temperatures in degrees Centigrade, illustrate the invention.

EXAMPLES 1-4

PREPARATION OF PRECONDENSATE

EXAMPLE 1

103 Parts diethylene triamine and 84 parts DCDA are heated to 110°. At this temperature an exothermic reaction begins and ammonia is evolved. The temperature is allowed to rise to 150°, then held at 160° for 6 hours to complete the reaction, by which time 34 parts of ammonia have been evolved. Finally the reaction mixture is cooled to room temperature and powdered.

125 Parts of the solid product are dispersed in 80 parts water containing 0.75 parts polyvinyl alcohol (Poval 204) and neutralized to pH 7-7.5 with 96.25 parts 28% hydrochloric acid at a temperature below 50°. The mixture is then raised to 90° and stirred until all solids dissolve. 250 Parts of this solution are cooled to room temperature and 12.5 parts epichlorohydrin are gradually added while stirring at room temperature, the temperature not being allowed to rise above 40° C. Stirring is continued for 3 hours, during which time the temperature falls to ambient temperature, then 12.5 parts 85% formic acid are added to give a pH of 4-4.5. A milky white dispersion is obtained which may be used as an aftertreatment agent for dyeings on cotton, wool or silk.

EXAMPLES 2, 3

Example 1 is repeated using 6.25 parts or 25 parts epichlorohydrin (0.1 and 0.4 moles/mole DCDA) in place of 12.5 parts (0.2 moles/mole DCDA).

EXAMPLE 4

The procedure of Example 1, first paragraph, is repeated. The resulting solid product is then dissolved in ice water and neutralized with 50% sulphuric acid to give a yellow solution of pH 7.5-7.8 containing approximately 55% solids by weight.

To 100 parts of this solution is added 9.7 parts epichlorohydrin over 1 hour at room temperature. The temperature is raised to 35° and stirring is continued overnight. Finally the pH of the product is adjusted to 4-4.5 by adding approximately 9.5 parts of 50% sulphuric acid. The resulting dispersion of the sulphate salt of the reaction product is stirred until homogeneous. The product is a stable dispersion which may be used as an aftertreatment agent for dyeings on cotton, wool or silk.

EXAMPLES 5, 6

AFTERTREATMENT OF DIRECT DYEINGS ON COTTON

EXAMPLE 5

A cotton substrate dyed with 3% wt. of Colour Index Direct Blue 251 is treated with an aftertreatment liquor at a liquor to goods ratio of 20:1, the liquor containing 5 g/l sodium sulphate and 6% wt. based on dry weight of substrate of the dispersion obtained in Example 1 (approx. 2.6% wt. active solids based on dry weight of substrate.

The bath is raised from room temperature to 40° over 5-10 minutes and held at 40° for 5 minutes. To the bath is then added 4 ml/l of 30% caustic soda solution, and the bath is held for a further 25 minutes at 40°. Finally the substrate is rinsed and dried at 50°. A dyeing with excellent wet fastness properties is obtained.

EXAMPLE 6

Example 5 is repeated except that no caustic soda is added to the aftertreatment bath. After 30 minutes at 40° the substrate is dried at 150°, 5 minutes. Similar results are obtained.

EXAMPLES 7-10

AFTERTREATMENT OF METAL COMPLEX DYEINGS ON WOOL AND SILK

A wool substrate is dyed with 1.5% of Colour Index Acid Red 399 in a bath containing 3% (based on the substrate) ammonium sulphate, at a pH of 6.5.

After rinsing, the dyed substrate is treated at a liquor to goods ratio of 30:1 with an aftertreatment bath held at pH 8 by a $Na_2HPO_4/NaH_2PO_4$ buffer system and containing 6% wt. (based on dry weight of substrate) of the dispersion of Example 1. The bath is raised to 40° over 5-10 minutes and held at 40° for 30 minutes. After rinsing and drying, a dyeing with good wet fastness properties is obtained.

EXAMPLE 8

A lightly chlorinated wool substrate is dyed with 3.0% of Colour Index Acid Red 399 in a bath containing 3% (based on the substrate) ammonium sulphate, at a pH of 6.5.

After rinsing, the dyed substrate is treated at a liquor to goods ratio of 30:1 with an aftertreatment bath containing 4.0% (based on dry weight of substrate) of the dispersion of Example 4. After 5 minutes 6.0% (based on the dry weight of the substrate) soda ash is added, and the treatment is continued for a further 25 minutes. The temperature of the aftertreatment bath is maintained at 30° throughout the treatment and the final pH of the bath is 9.8. After rinsing and drying, a dyeing of very good wet fastness properties is obtained.

EXAMPLE 9

Example 8 is repeated using 2.4% Colour Index Acid Blue 296. Similar good results are obtained.

EXAMPLE 10

A silk substrate is dyed with 4.0% Colour Index Acid Red 399 in a bath containing 1.0% acetic acid and 10.0% Glauber's Salt (all based on the weight of the substrate).

After rinsing, the dyed substrate is treated at a liquor to goods ratio of 30:1 with an aftertreatment bath containing 4.0% of the dispersion of Example 4. After 5 minutes, 6.0% soda ash is added and the treatment is continued for a further 25 minutes. The treatment bath is maintained at 30° throughout the treatment and the final pH is 10.1.

After rinsing and drying, a dyeing of very good wet fastness properties is obtained.

EXAMPLE 11

AFTERTREATMENT OF ACID DYEINGS ON WOOL

A wool substrate is dyed with the following combination of acid dyes (all based on the weight of the substrate):

4.0% Acid Red 336
0.6% Acid Blue 126 in a bath containing 3.0% (based on the substrate) acetic acid at pH 5.0.

After rinsing, the dyed substrate is treated at a 30:1 liquor to goods ratio with an aftertreatment bath containing 2.0% (on the weight of the substrate) of the dispersion of Example 4. After 5 minutes, 3.0% (on the weight of the substrate) soda ash is added and the treatment is continued for a further 25 minutes. The temperature of the aftertreatment bath is maintained at 30° and the final pH of the bath is 9.9.

After rinsing and drying, a dyeing of good wet fastness, particularly perspiration fastness, is obtained.

EXAMPLE 12

AFTERTREATMENT OF REACTIVE DYEINGS ON COTTON

A cotton substrate is dyed in conventional manner with 6% (based on dry weight of substrate) of C.I. Reactive Blue 79, and the dyed substrate is given one cold rinse. After rinsing, one part of the substrate is left without further treatment, a second part is treated with 4% (based on the substrate) of the dispersion of Example 4 for 30 minutes at 40°, then rinsed, while a third part is treated with 4% of the dispersion of Example 4 for 15 minutes at 40°, then 2 g/l sodium hydroxide is added to the bath and the sample is treated at 40° for a further 15 minutes, then rinsed. All three samples are dried and tested by the I.S.O. No. 3 wash test against multifibre material. Staining on adjacent cotton samples is very much less for the treated then for the untreated dyed substrate.

What is claimed is:

1. A process for improving the fastness properties of a dyestuff or optical brightener on a substrate which comprises fibres containing hydroxy-, amino- or thiol-groups and which has been dyed, printed or brightened with the dyestuff or optical brightener, said process comprising (1) applying to said substrate a precondensate obtained by reacting
   (A) the product of reacting a mono- or polyfunctional primary or secondary amine with cyanamide, dicyandiamide (DCDA), guanidine or biguanidine, wherein up to 50 mole % of the cyanamide, DCDA, guanidine or biguanidine may be replaced with a dicarboxylic acid or mono- or di-ester thereof, said product (A) containing reactive hydrogen atoms bound to nitrogen, with
   (B) an epihalohydrin or a precursor thereof and acidifying the reaction product to pH 2-5 and (2) subjecting the substrate to a cross-linking step subsequently to or simultaneously with the application of the precondensate thereto.

2. A process according to claim 1 in which the reaction product of (A) and (B) is acidified with sulphuric acid.

3. A process according to claim 1 in which the reaction product of (A) and (B) is acidified in the presence of a water-soluble polymer.

4. A process according to claim 3 in which the water-soluble polymer is polyvinyl alcohol, polyacrylamide or hydroxyethyl cellulose.

5. A process according to claim 1 wherein the precondensate is one obtained by reacting (A) with (B) at a temperature below 40° C. and in a mole ratio of (A):(B) in the range 1:0.1–0.5, based on the moles of cyanamide, DCDA, guanidine or biguanidine in (A).

6. A process according to claim 5 wherein (A) is a product of reacting 0.1 to 1 mole of cyanamide, DCDA, guanidine or biguanidine per mole of reactive —NH— or —NH$_2$ groups.

7. A process according to claim 6 wherein (A) is the reaction product of cyanamide, DCDA or guanidine with a polyamine of formula I

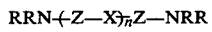

$$RRN(-Z-X)_nZ-NRR \qquad I$$

in which each R, independently, is hydrogen or a $C_{1-10}$alkyl group unsubstituted or monosubstituted with hydroxy, $C_{1-4}$alkoxy or cyano, n is a number from 0 to 100, Z, or each Z independently when n>0, is $C_{2-4}$alkylene or hydroxyalkylene and X, or each X, independently, when n>1, is —O—, —S— or —NR— where R is as defined above, provided that the polyamine of formula I contains at least one reactive —NH— or —NH$_2$ group.

8. A process according to claim 7 wherein, in component (A), up to 20 mole % of the cyanamide, DCDA or guanidine may be replaced with a dicarboxylic acid or mono- or di-ester thereof.

9. A process according to claim 7 wherein (B) is epichlorohydrin or dichlorohydrin.

10. A process according to claim 7 wherein the reaction product of (A) with (B) contains 0.1 to 5%, by weight, of a water-soluble polymer during the acidification step.

11. A process according to claim 8 wherein (B) is epichlorohydrin or dichlorohydrin.

12. A process according to claim 7 wherein the substrate is cellulose or regenerated cellulose dyed or printed with a reactive or direct dyestuff or natural polyamide dyed or printed with an acid or metal complex dyestuff and the amount of precondensate applied is 1 to 3%, based on the dry weight of the substrate.

13. A process according to claim 11 wherein the mole ratio of (A):(B) is in the range 1:0.1–0.29, based on the moles of cyanamide, DCDA, guanidine or biguanidine in (A).

14. A process for improving the fastness properties of a dyestuff or optical brightener on a substrate comprising fibres containing amino- or thiol-groups by applying to the dyed or printed substrate a precondensate obtained by reacting
   (A) the product of reacting a mono- or polyfunctional primary or secondary amine with cyanamide, dicyandiamide (DCDA), guanidine or biguanidine; whereby up to 50 mole % of the cyanamide, DCDA, guanidine or biguanidine may be replaced with a dicarboxylic acid or mono- or diester thereof, said product (A) containing reactive hydrogen atoms bound to nitrogen, and
   (B) an epihalohydrin or a precursor thereof and acidifying the reaction product to pH 2–5 and carrying out a cross-linking step subsequently to or simultaneously with the application to the substrate.

15. A process according to claim 14 in which the dyestuff is a metallised or acid dyestuff and the substrate is wool or silk.

16. A process according to claim 14 in which the precondensate is a stable aqueous dispersion obtained by acidifying the reaction product of (A) and (B) to pH 2–5.

17. A process according to claim 14 wherein (A) is a product of reacting 0.1 to 1 mole of cyanamide, DCDA, guanidine or biguanidine per mole of reactive —NH— or —NH$_2$ groups.

18. A process according to claim 17 wherein (A) is the reaction product of cyanamide, DCDA or guanidine with a polyamine of formula I

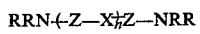  I in which each
  R, independently, is hydrogen or a C$_{1-10}$ alkyl group unsubstituted or monosubstituted with hydroxy, C$_{1-4}$alkoxy or cyano,
  n is a number from 0 to 100,
  Z, or each Z independently when n>0, is C$_{2-4}$alkylene or hydroxyalkylene
and
  X, or each X, independently, when n>1, is —O—, —S— or —NR— where R is as defined above,
provided that the polyamine of formula I contains at least one reactive —NH— or —NH$_2$ group.

19. A process according to claim 18 wherein, in component (A), up to 20 mole % of the cyanamide, DCDA or guanidine may be replaced with a dicarboxylic acid or mono- or di-ester thereof.

20. A process according to claim 18 wherein (B) is epichlorohydrin or dichlorohydrin.

21. A process according to claim 18 wherein the reaction product of (A) with (B) contains 0.1 to 5%, by weight, of a water-soluble polymer during the acidification step.

22. A process according to claim 19 wherein (B) is epichlorohydrin or dichlorohydrin.

23. A process according to claim 18 wherein the substrate is cellulose or regenerated cellulose dyed or printed with a reactive or direct dyestuff or natural polyamide dyed or printed with an acid or metal complex dyestuff, the precondensate is in aqueous solution and the amount of precondensate applied is 1 to 3%, based on the dry weight of the substrate.

24. A process according to claim 22 wherein the mole ratio of (A):(B) is in the range 1:0.1–29, based on the moles of cyanamide, DCDA, guanidine or biguanidine in (A).

25. A dispersion according to claim 26 which is acidified with sulphuric acid.

26. A stable aqueous dispersion of a precondensate obtained by reacting, at a temperature below 40° C.,
  (A) the product of reacting a mono- or polyfunctional primary or secondary amine with cyanamide, dicyandiamide (DCDA), guanidine or biguanidine, wherein up to 50 mole % of the cyanamide, DCDA, guanidine or biguanidine may be replaced with a dicarboxylic acid or mono- or di-ester thereof, said product (A) containing reactive hydrogen atoms bound to nitrogen, with
  (B) an epihalohydrin or a precursor thereof and acidifying the reaction product to pH 2–5, with the proviso that the mol ratio (A):(B) is 1:0.1–0.5, based on the number of mols of cyanamide, DCDA, guanidine or biguanidine in (A).

27. A dispersion according to claim 26 obtained by reacting (A) and (B) and acidifying the reaction product in the presence of a water-soluble polymer.

28. A dispersion according to claim 27 in which the water-soluble polymer is polyvinyl alcohol, polyacrylamide or hydroxyethyl cellulose.

29. A composition according to claim 26 wherein (A) is a product of reacting 0.1 to 1 mole of cyanamide, DCDA, guanidine or biguanidine per mole of reactive —NH— or —NH$_2$ groups.

30. A composition according to claim 29 wherein (A) is the reaction product of cyanamide, DCDA or guanidine with a polyamine of formula I

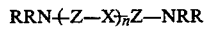  I in which each
  R, independently, is hydrogen or a C$_{1-10}$ alkyl group unsubstituted or monosubstituted with hydroxy, C$_{1-4}$alkoxy or cyano,
  n is a number from 0 to 100,
  Z, or each Z independently when n>0, is C$_{2-4}$alkylene or hydroxyalkylene
and
  X, or each X, independently, when n 1, is —O—, —S— or —NR— where R is as defined above,
provided that the polyamine of formula I contains at least one reactive —NH— or —NH$_2$ group.

31. A composition according to claim 30 wherein, in component (A), up to 20 mole % of the cyanamide, DCDA or guanidine may be replaced with a dicarboxylic acid or mono- or di-ester thereof.

32. A composition according to claim 30 wherein (B) is epichlorohydrin or dichlorohydrin.

33. A composition according to claim 30 wherein the reaction product of (A) with (B) contains 0.1 to 5%, by weight, of a water-soluble polymer during the acidification step.

34. A composition according to claim 31 wherein (B) is epichlorohydrin or dichlorohydrin.

35. A composition according to claim 34 wherein the mole ratio of (A):(B) is in the range 1:0.1–0.29, based on the moles of cyanamide, DCDA, guanidine or biguanidine in (A).

36. A method of stabilising a precondensate obtained by reacting, at a temperature below 40° C.,
  (A) the product of reacting a mono- or polyfunctional primary or secondary amine with cyanamide, dicyandiamide (DCDA), guanidine or biguanidine, wherein up to 50 mole % of the cyanamide, DCDA, guanidine or biguanidine may be replaced with a dicarboxylic acid or mono- or di-ester thereof, said product (A) containing reactive hydrogen atoms bound to nitrogen, with
  (B) an epihalohydrin or a precursor thereof in a mol ratio of (A):(B) in the range 1:0.1–0.5, based on the number of mols of cyanamide, DCDA, guanidine or biguanidine in (A), comprising the step of acidifying the reaction product to pH 2–5.

37. A method according to claim 36 wherein (A) is a product of reacting 0.1 to 1 mole of cyanamide, DCDA, guanidine or biguanidine per mole of reactive —NH— or —NH$_2$ groups.

38. A method according to claim 37 wherein (A) is the reaction product of cyanamide, DCDA or guanidine with a polyamine of formula I $$RRN-(Z-X)_{\overline{n}}Z-NRR \qquad \text{I}$$

in which each
- R, independently, is hydrogen or a $C_{1-10}$ alkyl group unsubstituted or monosubstituted with hydroxy, $C_{1-4}$alkoxy or cyano,
- n is a number from 0 to 100,
- Z, or each Z independently when n>0, is $C_{2-4}$alkylene or hydroxyalkylene and
- X, or each X, independently, when n>1, is —O—, —S— or —NR— where R is as defined above, provided that the polyamine of formula I contains at least one reactive —NH— or —NH$_2$ group.

39. A method according to claim 38 wherein, in component (A), up to 20 mole % of the cyanamide, DCDA or guanidine may be replaced with a dicarboxylic acid or mono- or di-ester thereof.

40. A method according to claim 38 wherein (B) is epichlorohydrin or dichlorohydrin.

41. A method according to claim 38 wherein the reaction product of (A) with (B) contains 0.1 to 5%, by weight, of a water-soluble polymer during the acidification step.

42. A method according to claim 39 wherein (B) is epichlorohydrin or dichlorohydrin.

43. A method according to claim 42 wherein the mole ratio of (A):(B) is in the range 1:0.1–0.29, based on the moles of cyanamide, DCDA, guanidine or biguanidine in (A).

44. A method according to claim 36 comprising the step of acidifying the reaction product of (A) and (B) in the presence of a water-soluble polymer.

45. A stable aqueous dispersion according to claim 18 wherein
- (A) is the product of reacting a polyalkylene polyamine with DCDA in substantially equimolar quantities and
- (B) is epichlorohydrin.

* * * * *